(12) United States Patent
Ohtomo et al.

(10) Patent No.: US 7,319,515 B2
(45) Date of Patent: Jan. 15, 2008

(54) ROTARY LASER APPARATUS

(75) Inventors: Fumio Ohtomo, Tokyo (JP); Kunihiro Hayashi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 151 days.

(21) Appl. No.: 11/213,776

(22) Filed: Aug. 25, 2005

(65) Prior Publication Data

US 2006/0050345 A1    Mar. 9, 2006

(30) Foreign Application Priority Data

Sep. 3, 2004    (JP) ............................. 2004-257242

(51) Int. Cl.
*G01B 11/26* (2006.01)
(52) U.S. Cl. .................... 356/139.1; 250/236; 359/200
(58) Field of Classification Search .............. 356/139.1
See application file for complete search history.

(56) References Cited

U.S. PATENT DOCUMENTS

2003/0136901 A1*  7/2003 Ohtomo et al. ............. 250/234
2005/0274879 A1* 12/2005 Osaragi et al. ......... 250/231.13

FOREIGN PATENT DOCUMENTS

| JP | 8-145675 | 6/1996 |
|---|---|---|
| JP | 2002-527729 | 8/2002 |
| JP | 2003-214852 | 7/2003 |

OTHER PUBLICATIONS

Japan Patent Office, Official Action in JP 2004-257242, mailed Jan. 30, 2007, Japan Patent Office, Japan.

* cited by examiner

*Primary Examiner*—Thomas H. Tarcza
*Assistant Examiner*—Timothy Brainard
(74) *Attorney, Agent, or Firm*—Chapman and Cutler LLP (57) ABSTRACT

A rotary laser apparatus includes a light-projection section configured to irradiate at least two fan-shaped beams extending in a fan-shaped form in a direction orthogonal to a rotary axis. The light-projecting section includes a laser beam source for generating a laser beam in a direction of the rotary axis, and a rotation-irradiating section configured for irradiating the laser beam from the laser beam source in directions orthogonal to the rotary axis. The rotation-irradiating section includes a plurality of penta prisms and a beam splitter. The plurality of the penta prisms are arranged in the direction of the rotary axis depending upon the number of the fan-shaped beams such that light-emitting directions of the respective penta prisms differ from each other or one another, and the beam splitter is configured to the laser beam as required the penta prism arranged above.

17 Claims, 5 Drawing Sheets

ROTARY LASER APPARATUS

BACKGROUND OF THE INVENTION

1. Field of the Invention

The present invention relates to a rotary laser apparatus which irradiates plural fan-shaped laser beams under rotation in directions orthogonal to a rotary axis and is used to measure an inclined angle and a height of a site relative to a plane orthogonal to the rotary axis through the irradiated light beams being received with a light-receiving sensor at a position distant from a light-projecting section.

2. Background Technique

Heretofore, there is known a rotary laser apparatus having a construction in which a laser beam source is provided directly on a rotary head (rotation-irradiating section) so as to be rotated relative to an apparatus body (For example, see Patent literature 1: JP-A 2002-527729). According to this apparatus, a cylindrical lens for converting a laser beam from the laser beam source into a fan-shaped laser beam is integrally provided at the rotary head, and the laser beam source and the cylindrical lens are integrally rotated in an identical direction together with the rotary head, so that fan-shaped laser beams are irradiated under rotation.

Further, another rotary laser apparatus is also known in which a laser beam source is provided at an apparatus body (For example, see Patent literature 2: JP-A 2003-214852). According to this apparatus, a laser beam is led to a rotary head along a rotary axis, and biased in a direction orthogonal to the rotary axis. The thus biased laser beam is converted to fan-shaped laser beams with a cylindrical lens or a diffraction lattice, and irradiated under rotation in directions orthogonal to the rotary axis. A reflection mirror, a penta prism or an optical member equivalent thereto is used for biasing the laser beams.

In order to measure an inclined angle and a height of a site with reference to the rotating fan-shaped laser beams, the rotary head must be rotated at a constant and high speed, while the fan-shaped laser beams are not wobbled.

According to the rotary laser apparatus in which the laser beam source and the cylindrical lens are provided directly at the rotary head, the construction of the optical element can be simplified. However, since the apparatus is configured such that the laser beam source is provided directly at the rotary head, deviations of the rotary axis makes direct influences upon the fan-shaped laser beams, so that this unfavorably directly affects detection accuracy of the light-receiving sensor. Furthermore, since an electric power supply mechanism such as a slip ring must be provided in supplying electric power to the laser beam source provided at the rotary head, the electric power-supplying mechanism becomes generally complicated.

On the other hand, according to the rotary laser apparatus in which the laser beam source is provided at the apparatus body, the laser beam is led to the rotary head along the rotary axis, the laser beam is biased in a direction orthogonally to the rotary axis by means of the reflection mirror, the penta prism or the equivalent optical member, the thus biased laser beam is divided into at least two fan laser beams in specified directions, and the divided laser beams are irradiated through the rotary head portion. Since the penta prism or its equivalent optical member has a property of biasing the incident light beam to one orthogonal to the incident direction and emitting it, the rotary axis can be prevented from being wobbled. However, it is not easy to divide the laser beam and rectify the divided laser beams such that each of the laser beams biased in the direction orthogonal to the rotary axis is converted to plural fan-shaped lasers each having a specified shape.

SUMMARY OF THE INVENTION

A first aspect of the present invention, which has been accomplished in view of the above circumstances, is to provide a rotary laser apparatus that can easily divide the laser beam and prevent wobbling of the divided laser beams owing to vibration under rotation as much as possible.

The rotary laser apparatus according to the present invention comprises a light-projection section configured to irradiate at least two fan-shaped beams extending in a fan-shaped form in a direction orthogonal to a rotary axis, said light-projecting section comprising a laser beam source for generating a laser beam in a direction of the rotary axis, and a rotation-irradiating section configured for irradiating the laser beam from the laser beam source in directions orthogonal to the rotary axis, said rotation-irradiating section comprising a plurality of penta prisms and a beam splitter, said plurality of the penta prisms being arranged in the direction of the rotary axis depending upon the number of said fan-shaped beams such that light-emitting directions of the respective penta prisms differ from each other or one another, and said beam splitter being configured to the laser beam as required the penta prism arranged above.

The following are preferred embodiments of the rotary laser apparatus according to the present invention. Any combinations of them are also preferred embodiments of the rotary laser apparatus of the present invention unless any contradiction occurs.

(1) The rotary laser apparatus further comprises cylindrical lenses provided at emitting planes of the respective penta prisms and each configured to convert the laser beam to the fan-shaped beam, and inclinations of the fan beams are set by arrangement of the respective cylindrical lens.

(2) The rotary laser apparatus further comprises a polarizing plate between the laser beam source and the rotation-irradiating section, said polarizing plate being configured to enter the laser beam from the laser beam source into the penta prism in the form of a circularly polarized light beam.

(3) The beam splitter is arranged between the adjacent penta prisms, and divide the laser beam from the laser beam source such that light amounts of the fan-shaped beams formed by the respective penta prisms are specified values.

(4) The rotary laser apparatus further comprises a rotary cylinder and wherein the penta prisms are arranged, inside the rotary cylinder, corresponding to the number of the fan-shaped beams, the rotary cylinder being supported by bearings at opposite ends thereof as viewed in the rotary axis, and wherein the fan-shaped beams are irradiated under rotation in directions orthogonal to the rotary axis by rotating the rotary cylinder.

(5) The rotation-irradiating section comprises a rotary cylinder, and the rotation-irradiating section and the laser beam source are integrally inclinable in at least one direction with respect to a perpendicular line.

(6) The rotary laser apparatus further comprises a polarized light-removing plate or a 1/4 wavelength plate at said projecting portion.

Another aspect of the present invention further provides a rotary laser apparatus comprising a light-projecting section and a rotation-irradiating section;

said light-projecting section comprising a laser beam projector for emitting a projecting laser beam, a collimator lens for converting the laser beam emitted from the laser beam projector to a parallel beam, and a fixed cylinder rotatably supporting a rotary cylinder to be rotated around an optical axis of the collimator lens;

said rotation-irradiating section comprising first, second and third optical members and said rotary cylinder, said first, second and third optical members being configured to form first, second and third fan-shaped laser beams, respectively, each having a fan-shaped plane expanding as the laser beam goes apart from said axis;

said first optical member comprising a first penta prism and a first lens, said first penta prism comprising an incident plane which is orthogonal to the optical axis of the collimator lens and into which parallel light beam is led, a permeable plane which reflects a part of the parallel light beam entering the incident plane and permeates the remainder therethrough, an emitting plane, and a reflecting plane which biases the parallel light beam reflected from the permeable plane in a direction orthogonal to the optical axis of the collimator lens and reflects the beam toward the emitting plane, said first lens converting the parallel light beam emitted from the emitting plane to a first fan-shaped laser flux;

said second optical member comprising a second penta prism and a second lens, said second penta prism comprising an incident plane which is orthogonal to the optical axis of the collimator lens and into which the parallel light beam having permeated the permeable plane of the first penta prism are led, a permeable plane which reflects a part of the parallel light beams entering the incident plane and permeates the remainder therethrough, an emitting plane, and a reflecting plane which biases the parallel light beam reflected from the permeable plane in a direction orthogonal to the optical axis of the collimator lens and reflects the beam toward the emitting plane, the second lens converting the parallel light beam emitted from the emitting plane to a second fan-shaped laser flux;

the third optical member comprising a third penta prism and a third lens, said third penta prism comprising an incident plane which is orthogonal to the optical axis of the collimator lens and into which a parallel light beam having permeated the permeable plane of the second penta prism is led, a first reflecting plane which reflects the parallel light beams entering the incident plane, an emitting plane, and a second reflecting plane which biases the parallel light beam reflected from the permeable plane in a direction orthogonal to the optical axis of the collimator lens and reflects the beam toward the emitting plane, the third lens being configured for converting the parallel light beam emitted from the emitting plane to a third fan-shaped laser flux;

a first beam splitter being provided between the permeable plane of the first penta prism and the incident plane of the second penta prism, the beam splitter burying a gap between the first penta prism and the second penta prism, and determining a transmittance/reflectance;

a second beam splitter being provided between the permeable plane of the second penta prism and the incident plane of the third penta prism, the beam splitter burying a gap between the second penta prism and the third penta prism, and determining a transmittance/reflectance;

an auxiliary member for supplementing pressing being provided at the first reflecting plane of the third penta prism, said auxiliary member having a pressing surface parallel to the first reflecting plane and the incident planes;

the first penta prism and the third penta prism being axially fixed in the rotary cylinder under pressure, holding the second penta prism therebetween, while the emitting planes of the first and third penta prisms and being deviated from each other in a rotating direction of the rotary cylinder, such that the first and third fan-shaped planes of the first and third fan-shaped laser beams, respectively may form the specific angle and that the first and third fan-shaped planes of the first and third fan-shaped laser beams, respectively may be symmetrical with each other via the fan-shaped plane of the second fan-shaped laser beam.

The following is a preferred embodiment of another aspect of the present invention. That is, the rotary laser apparatus, which further comprises a polarized light-removing plate or a ¼ wavelength plate at said projecting portion.

According to the rotary laser apparatus according to the first aspect of the present invention, the laser beam can be easily divided, and wobbling due to vibration under rotation can be prevented as much as possible.

According to the second aspect of the present invention, since the penta prisms are arranged and held vertically in three stages in the rotary cylinder to be rotated while being held by the fixed cylinder. Thus, wobbling of the penta prisms due to vibration under rotation can be prevented as much as possible even when the penta prisms are provided vertically in three stages to generate three fan-shaped laser beams.

In case that the polarized light-removing plate or the ¼ wavelength plate is provided at the light-projecting section, variations in the light amounts of the rotating fan-shaped laser beams the projecting laser beam can be prevented because the projecting laser beam emitted from the laser beam-projector is plane-polarized, even if the first and second beam splitters have plane-polarization characteristic. This application claims the convention priority of Japanese patent application No. 2004-257,242 filed on Sep. 3, 2004. The disclosure of Japanese patent application No. 2004-257,242 including the specification, drawings, and claims is incorporated herein by reference in its entirety.

BRIEF DESCRIPTION OF THE DRAWINGS

For a better understanding of the present invention, reference is made to the attached drawings, wherein.

DETAILED DESCRIPTION OF THE INVENTION

In the following, embodiments of the rotary laser apparatus according to the present invention will be explained with reference to the attached drawings.

Figure 1:
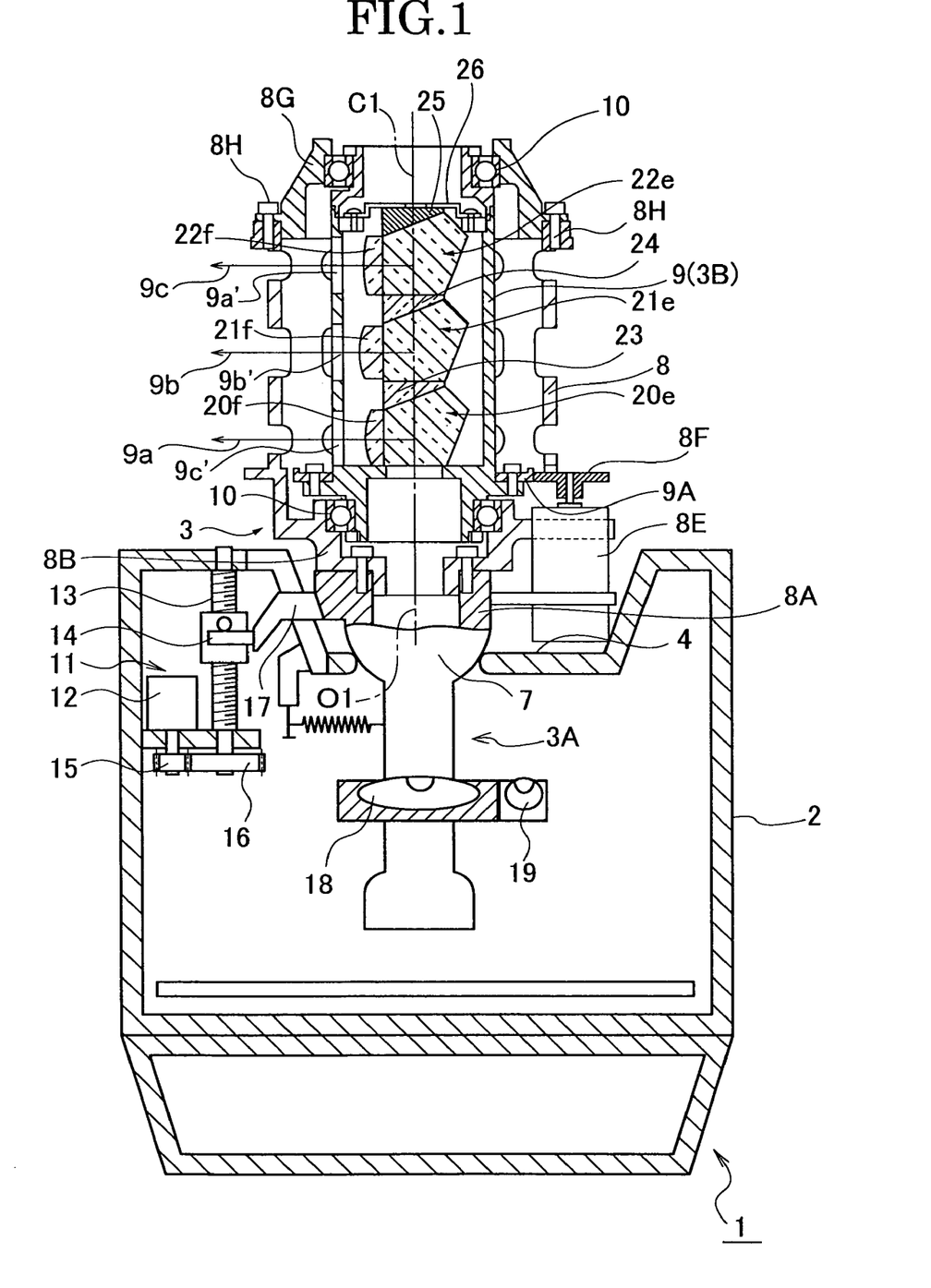
FIG. 1 is a sectional view of a principal portion of the entire structure of an embodiment of the rotary laser apparatus according to the present invention.

FIG. 1 shows an outline of a rotary laser apparatus 1 according to the present invention. This rotary laser apparatus 1 comprises a casing 2 and a light-projecting unit 3. The light-projecting unit 3 comprises a light source section 3A and a rotation-irradiating section 3B. A depressed portion 4 having an inversely frusto-conical shape is formed in a central portion of the casing 2. The light source portion 3A comprises a laser beam projector 5 and a collimator lens 6 (See FIG. 3). The collimator lens 6 converts the laser beam P emitted from the laser beam projector 5 to a parallel light flux P1.

Figure 2:
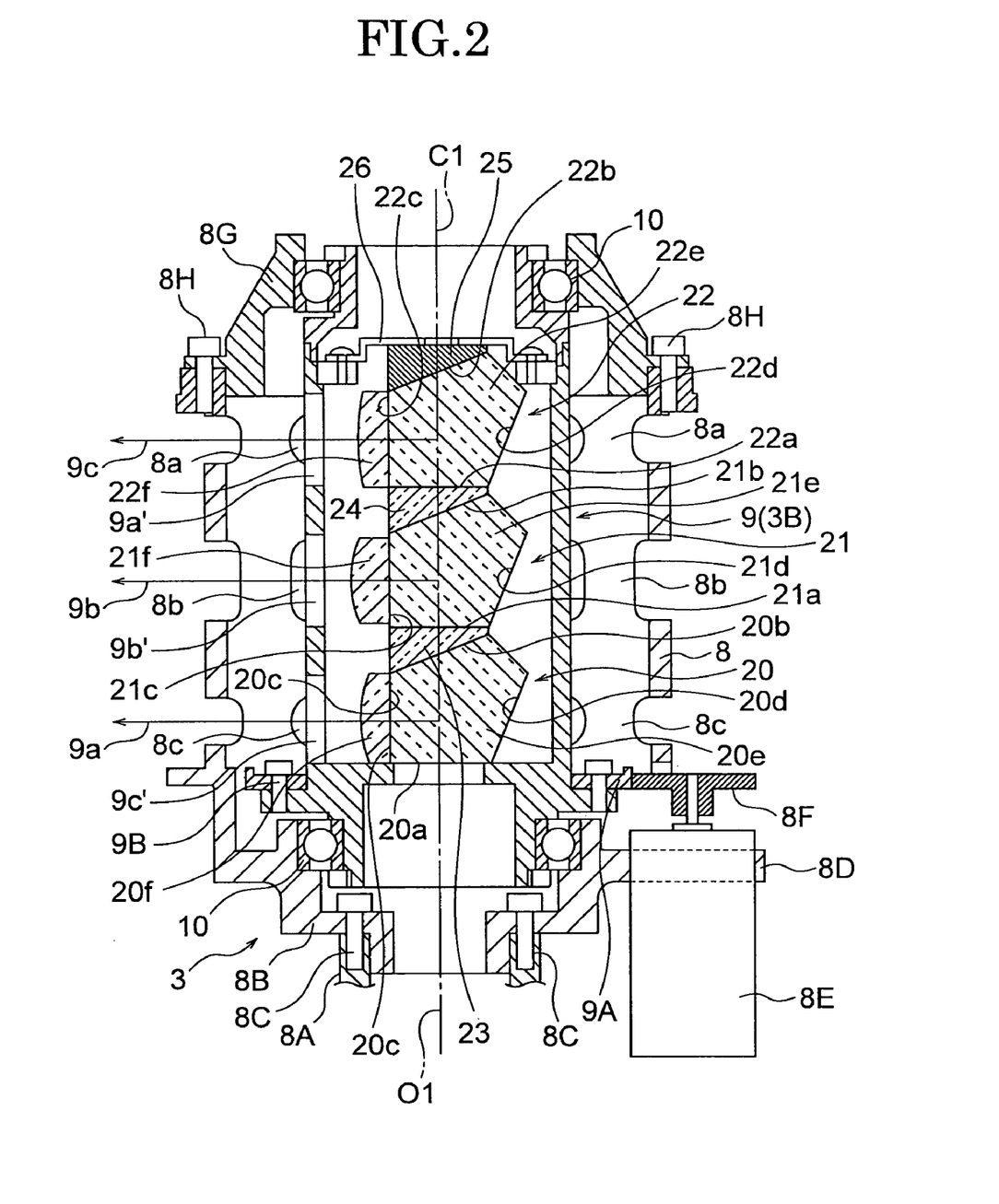
FIG. 2 is an enlarged view of a principal portion of the light-projecting section.

The light source portion 3A penetrates vertically depressed portion 4, and the light source portion 3A is supported rotatably in the depressed portion via a spherical seat 7. As shown in FIG. 2 in an enlarged scale, the light-projecting section 3A comprises a fixed cylinder 8, which is provided with a rotary cylinder 9 as the rotation-irradiating section 3B. In the fixed cylinder 8 are opened light-projecting windows 8a to 8c extending in the circumferential direction, which are spaced from each other in a vertical direction. The rotary cylinder 9 is provided with light-projecting windows 9a' to 9c' which correspond to the light-projecting windows 8a to 8c, respectively and are spaced from each other in the vertical direction.

The rotary shaft 9 is supported by the fixed cylinder 8 via bearing members 10 at vertically end portions thereof. The rotary cylinder 9 is rotatable around a rotary axis being an optical axis O1 of the collimator lens 6. First to third optical members are arranged inside the rotary cylinder 9 at three stages. The outline of the structure of the rotary cylinder 9, which is driven by a scanning motor, will be explained below.

As shown in FIG. 2, the fixed cylinder 8 comprises a lower cylinder 8A and an upper cylinder 8B. The upper cylinder 8B is fixed to the lower cylinder 8A by means of screws 8C. A fitting bracket 8D is fixed to the upper cylinder 8B. The scanning motor 8E is fixed to the fixing blanket 8D, and an output gear 8F is fitted to the scanning motor 8E. A follower gear 9A is fixed to a lower portion of the rotary cylinder 9 by screws 9B. The follower gear 9A meshes with the output gear 8F. A cover member 8G is fixed to upper portions of the fixed cylinder 8 and the rotary cylinder 9 by means of screws 8H. The rotary cylinder 9 is stably rotated around its axis by the scanning motor 8E.

The projector 3 is provided with two sets of inclining mechanisms. One of the inclining mechanisms is shown in FIG. 1. This one inclining mechanism is denoted by a reference numeral 11. The inclining mechanism 11 comprises an inclining motor 12, inclining screw members 13 and an inclining nut 14. Rotation of the inclining motor 12 is transmitted to the inclining screw member 13 via a driving gear 15 and an inclining gear 16, so that the inclining nut 14 is vertically moved following rotation of the inclined nut 14 is vertically rotated by rotation of the inclining screw member 13.

The inclining nut 14 is connected to the light source unit 3 via an inclining arm 17. The light-projecting unit 3 is inclined relative to the perpendicular line Cl by vertically moving the inclining nut 14. The other inclining mechanism inclines the light source unit 3 in a direction orthogonal to the inclining direction with the inclining mechanism 11.

The light-projecting unit 3 is provided with a fixed inclination sensor 18 extending in parallel to the extending direction of the inclining arm 17 and a fixed inclination sensor 19 extending in a direction orthogonal to the fixed inclination sensor 18.

The inclining mechanism 11 makes control to render the fixed inclination sensor 18 horizontally, whereas the other inclining mechanism makes control to render the fixed inclination sensor 19 horizontally. By adjusting them, the optical axis O1 (the axis of the rotary cylinder 9) is matched with the perpendicular line C1. The inclining mechanism is preferably operated to set the rotary laser apparatus 1 itself as horizontally as possible so as to bring the axis of the rotary cylinder 9 into line with the perpendicular line C1.

Figure 3:
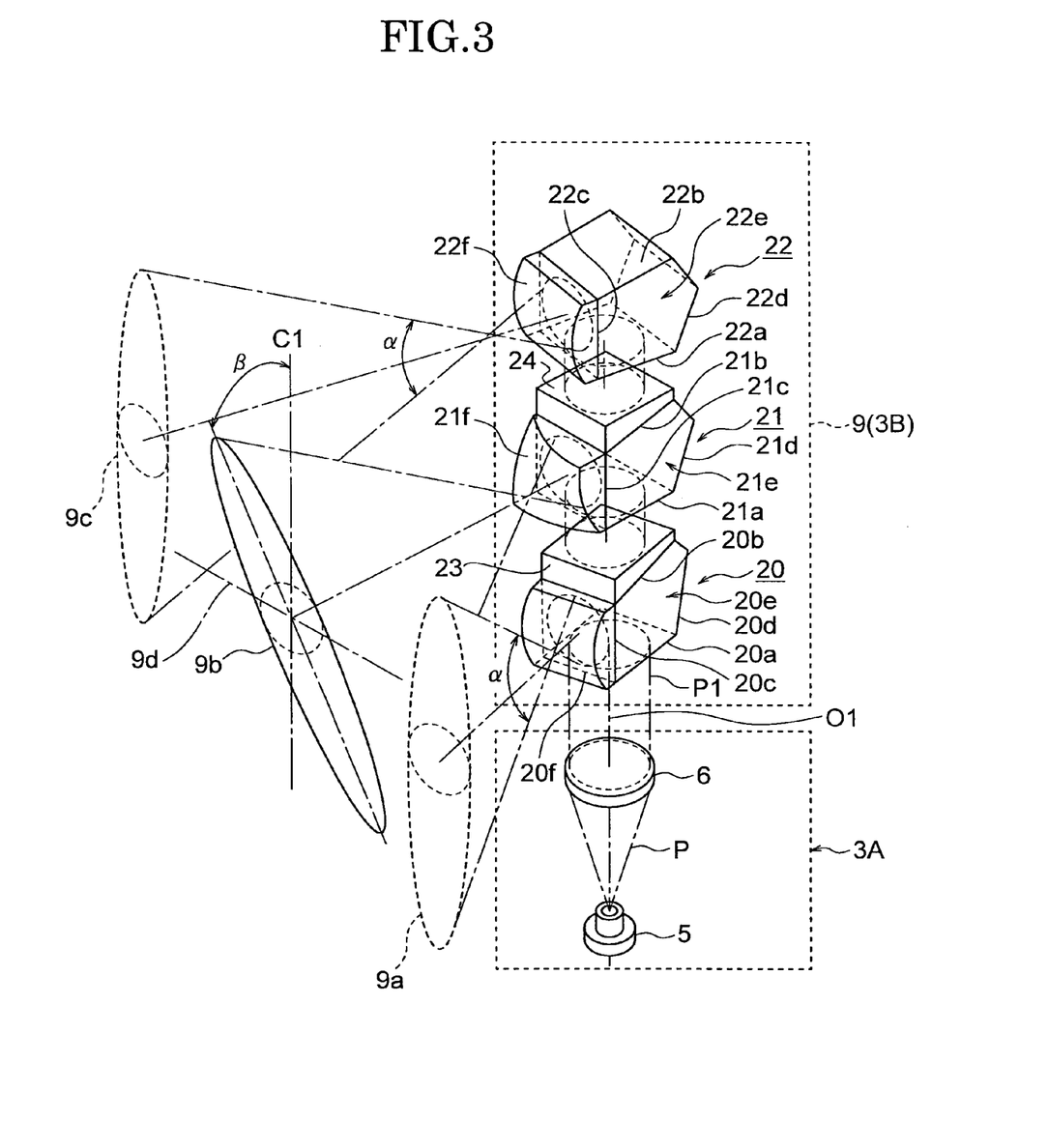
FIG. 3 is a decomposed and perspective view of an example of an arranged relation of optical members in a rotation-irradiating section shown in FIG. 2.

As shown in FIG. 3 in an enlarged scale, the first optical member 20 to the third optical member 22 are arranged in the rotary cylinder 9. The first to third optical members 20 to 22 form first to third fan-shaped laser beams 9a to 9c, respectively, which each expand as the laser beams go away from the axis of the rotary cylinder 9 (A sectional plane of each of the first to third fan-shaped laser beams has an oblong shape as shown in FIG. 3). A fan-shaped plane of the first fan-shaped laser beam 9a is orthogonal to a rotary plane (horizontal plane) 9d of the rotary cylinder 9. A fan-shaped plane of the second fan-shaped laser beam 9b is oblique to that of the first fan-shaped laser beam 9a. A fan-shaped plane of the third fan-shaped laser beam 9c is orthogonal to a rotary plane (horizontal plane) 9d of the rotary cylinder 9, and forms a specified angle between the fan-shaped plane of the first fan-shaped laser beam 9a.

The first optical member 20 comprises a first penta prism 20e and a first lens 20f. The first penta prism 20 comprises an incident plane 20a which is orthogonal to the optical axis O1 of the collimator lens 6 and into which parallel light beams are led, a permeable plane 20b which reflects a part of the parallel light beams entering the incident plane 20a and permeates the remainder therethrough, an emitting plane 20c, and a reflecting plane 20d which biases the parallel light beams reflected from the permeable plane 20b in a direction orthogonal to the optical axis of the collimator lens 6 and reflects them toward the emitting plane 20c. The first lens 20f converts the parallel light beams P1 emitted from the emitting plane 20c to a first fan-shaped laser flux 9a.

The second optical member 21 comprises a second penta prism 21e and a second lens 21f. The second penta prism 21e comprises an incident plane 21a which is orthogonal to the optical axis O1 of the collimator lens 6 and into which parallel light beams P1 having permeated the permeable plane 20b of the first penta prism 20e are emitted, a permeable plane 21b which reflects a part of the parallel light beam entering the incident plane 21a and permeates the remainder therethrough, an emitting plane 21c, and a reflecting plane 21d which biases the parallel light beams P1 reflected from the permeable plane 21b in a direction orthogonal to the optical axis of the collimator lens 6 and reflects them toward the emitting plane 21c. The second lens 21f converts the parallel light beams P1 emitted from the emitting plane 21c to a second fan-shaped laser flux 9b.

The third optical member 22 comprises a third penta prism 22e and a third lens 22f. The third penta prism 22e comprises an incident plane 22a which is orthogonal to the optical axis O1 of the collimator lens 6 and into which parallel light beams P1 having permeated the permeable plane 21b of the second penta prism 21e are led, a first plane 22b which reflects the parallel light beam P1 entering the incident plane 22a, an emitting plane 22c, and a second reflecting plane 22d which biases the parallel light beams reflected from the first reflecting plane 22b in a direction orthogonal to the optical axis of the collimator lens 6 and reflects them toward the emitting plane 22c. The third lens 22f converts the parallel light beams P1 emitted from the emitting plane 22c to a third fan-shaped laser flux 9c.

An edge prism 23 is provided integrally between the first penta prism 20e and the second penta prism 21e. The edge prism 23 buries a gap between the first penta prism 20e and the second penta prism 21e, and forms a beam splitter at the permeable plane 20b. Likewise, an edge prism 24 is provided integrally between the second penta prism 21e and the third penta prism 22e. The penta prisms 20, 21 and 22 thus integrated are fixed inside the rotary cylinder 9 by a fixing auxiliary member 25, a fixing plate 26 and screws.

Figure 4:
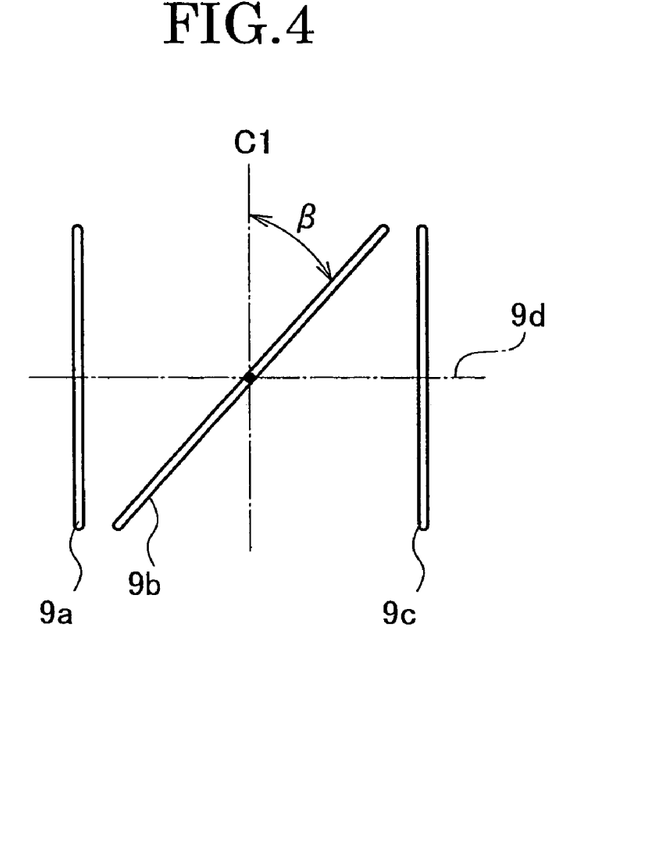
FIG. 4 is a view showing the positional relation of fan-shaped laser beams shown in FIG. 3.

As the first to third lenses 20f, 21f and 22f to form the fan-shaped laser beams 9a, 9b and 9c, respectively, convex cylindrical lenses are used as shown in FIG. 3. In order to make an opening angle "α" of the fan-shaped laser beam 9a equal to that "α" of the fan-shaped laser beam 9c, the focal distance of the first lens 20f is made equal to that of the third lens 22f. In this connection, the first fan-shaped laser beam 9a is projected deviated from the third fan-shaped layer beam 9c vertically corresponding to a difference in height between the first penta prism 20e and the third penta prism 22e. The deviation in the projecting height between the first fan-shaped laser beam 9a and the third fan-shaped laser beam 9c can be ignored at a place far from the axis of the rotary cylinder 9. As shown in FIG. 4, the first fan-shaped laser beam 9a is symmetrical with the third fan-shaped laser 9c via the second fan-shaped laser beam 9b.

Assume that the second fan-shaped laser beam 9b is emitted at an angle "β" with respect to the perpendicular line C1. In order to make the opening angle of the second fan-shaped laser beam 9b in the height direction equal to the opening angle "α" of the first and third fan-shaped laser beams 9a and 9c, the focal distance of the second lens 21f is (1/cos β) times as that of the first lens 20f and the third lens 22f. If the focal distance of the second lens 21f is (1/cos β) times that of the first lens 20f and the third lens 22f, the opening angle of the second fan-shaped laser beam 9b is α/cos β.

At that time, the opening angle of the second fan-shaped laser beam 9b in the horizontal direction is (α/cos β)·sin β. In order to avoid overlapping between the first fan-shaped laser beam 9a and the second fan-shaped laser beam 9b and overlapping between the second fan-shaped laser beam 9b and the third fan-shaped laser beam 9c, a specified angle of each of the first fan-shaped laser beam 9a and the third fan-shaped laser beam 9b must be not less than (α/cos β)·sin β, and the first and third fan-shaped laser beams 9a and 9c must be spaced by not less than {(α/cos β)·sin β}/2 around the axis of the rotary cylinder 9 with respect to the second fan-shaped laser beam in reverse directions, respectively.

In order to make amounts of the first fan-shaped laser beams 9a to 9c received by a light-receiving sensor (not shown) almost equal to one another on a light-receiving face in a vertical direction, the amounts of the parallel light fluxes P1 emitted from the emitting planes 20c to 22c, respectively, needs to be adjusted according to the opening angles of the first fan-shaped laser beams 9a to the third fan-shaped laser beams 9c, respectively. Since the open angel of the second fan-shaped laser beam 9b in the height direction is set at (1/cos β) times as great as the opening angle of each of the first and third fan-shaped laser beams 9a and 9c, the amount of the parallel light flux P1 emitted from the emitting plane 20b is (1/cos β) as great as that of the parallel flux P1 emitted from the emitting plane 20c or that of the parallel light flux P1 emitted from the emitting plane 22c.

Explanation has been made on the case where the convex cylindrical lenses are used for the first lens 20f to the third lenses 22f, respectively. However, concave cylindrical lenses may be used.

Figure 5:
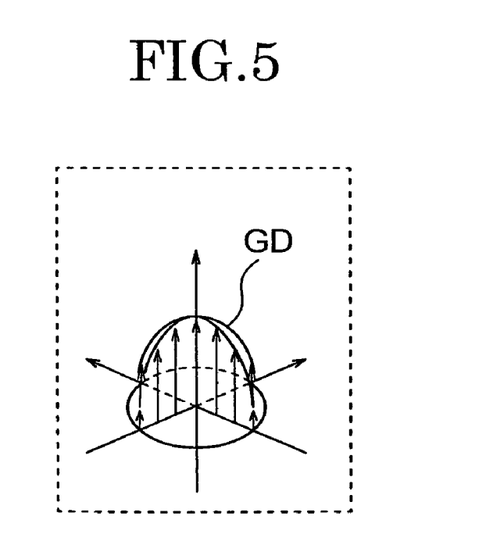
FIG. 5 is a view showing the intensity distribution of the laser beams emitted from the laser beam projector shown in FIG. 1.

Since the light-receivable range of the light-receiving sensor depends upon the light-receiving sensitivity of the light-receiving plane, the radiant intensity distribution of the laser beams consisting of the first to third fan-shaped laser beams 9a to 9c, the laser beams emitted from the laser beam projector 5 is adjusted such that the light amount intensity distribution GD may so appear from the peripheral portion to the central portion as to increase the intensity in the light amount distribution at positions near the horizontal direction as shown in FIG. 5.

It is preferable to bond the first penta prism 20 to the third penta prism 22a, the first edge prism 23, the second edge prism 24 and the fixing auxiliary member 25 to the respectively adjacent members by using an adhesive.

The first penta prism 20e and the third penta prism 22e are axially fixed in the rotary cylinder 9 under pressure, holding the second penta prism 20e therebetween, while the emitting planes 20c and 22c of the first and third penta prisms 20e and 22e are deviated from each other in a rotating direction of the rotary cylinder 9, such that the first and third fan-shaped planes of the first and third fan-shaped laser beams 9a and 9c, respectively may form the specific angle and that the first and third fan-shaped planes of the first and third fan-shaped laser beams 9a and 9c, respectively may be symmetrical with each other via the fan-shaped plane of the second fan-shaped laser beam 9b. In this embodiment, as shown in FIG. 2, the penta prisms 20e to 22e, the edge prisms 23 and 24 and thee fixed auxiliary member 25 are arranged in vertically three stages and fixed to the rotary cylinder 9 by the fixing plate 26 and the screw members 27.

According to the rotary laser beam apparatus 1 of this embodiment of the present invention, the optical members 20 to 22 are fixed to the rotary cylinder 9 under pressure, the rotary cylinder 9 is rotatably supported by the fixed cylinder 8, and the optical members 20 to 22 are rotated. Thus, each of the optical members can be stably rotated without being wobbling. In addition, even if the optical members 20 to 22 are slightly inclined relative to the optical axis O1 due to wobbling during rotation, the parallel light fluxes P1 is biased in the directions orthogonal to the optical axis O1 by using the penta prisms 20e to 22e. This construction prevents the biased angle from varying before and after the inclination of the penta prism 20 to 22a.

Figure 6:
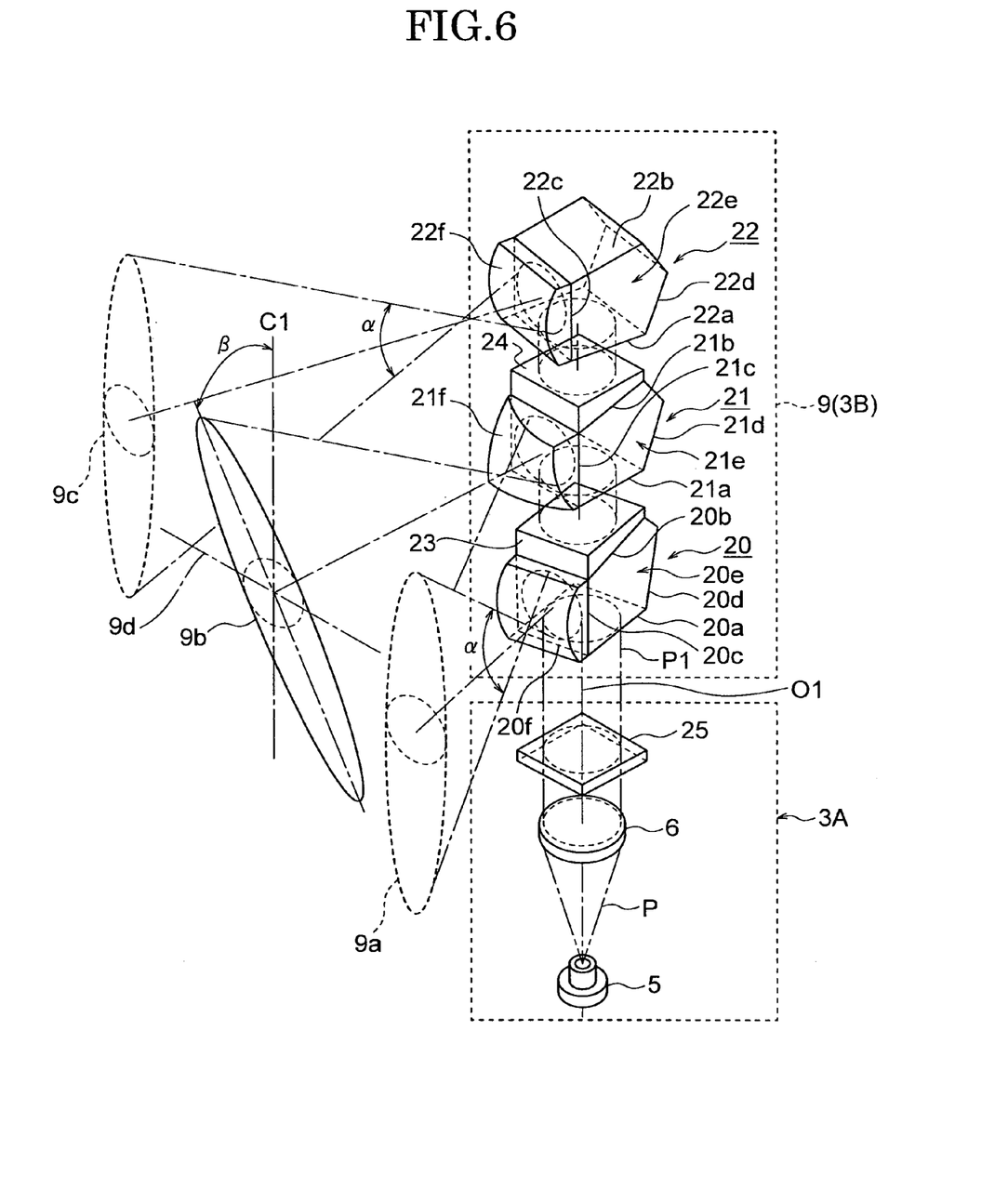
FIG. 6 is a decomposed and perspective view showing another example of the arranged relation of the optical members in the rotation-irradiating section shown in FIG. 2.

Heretofore, the specific embodiment of the present invention has been explained. If the laser beam emitted from the laser beam projector 5 is plane-polarized and polarized characteristic exists in the first edge prism 23 and the second edge prism 24, the emitted light amount of the parallel light fluxes P1 emitted from the emitting planes 20c to 22c, in turn the emitted light amount of each of the fan-shaped laser beams 9a to 9c emitted from the respective one of the optical members 20 to 22 varies in the rotating direction, depending upon the rotation angle of the rotary cylinder 9. Thus, in order to prevent variations in the emitted light amount under rotation of the fan-shaped laser beams 9a to 9c owing to the plane-polarization of the laser beam emitted from the laser beam projector 5, a 1/4 wavelength plate 25 is provided between the collimator lens 6 and the fist penta prism 20e as shown in FIG. 6 such that the crystalline direction of the 1/4 wavelength plate may be 45 degrees relative to the plane-polarized direction of the laser beam. Thereby, the parallel light flux having passed the 1/4 wavelength plate 25 may be circularly polarized. Instead of the 1/4 wavelength plate 25, a polarization-removing plate may be provided.

If a laser diode having an elliptical shape as to an orienting property of the emitted light beam is used for the laser beam projector 5, the laser beam emitted from the collimator lens 6 has an elliptical shape-characteristics. If no processing is effected, the orientating characteristics differ relative to the expanding direction of each of the fan-shaped laser beams 9a to 9c differ depending upon the rotating direction of the rotary cylinder 9. Thus, in this case, the elliptical rate may be removed by a known beam shape-rectifying method such as an anamophoric prism pair.

In the above embodiment of the present invention, the penta prisms are used. However, use may be made of a penta mirror having an incident mirror plane, a permeable mirror plane, a reflective mirror plane and an emitting mirror plane may be used.

What is claimed is:

1. A rotary laser apparatus, comprising:
   a light-projection section configured to irradiate at least two fan-shaped beams extending in a fan-shaped form in a direction orthogonal to a rotary axis;
   a laser beam source configured to generate a laser beam in a direction of the rotary axis;
   a rotation-irradiating section configured to rotatably irradiate the laser beam from the laser beam source in directions orthogonal to the rotary axis;
   a plurality of penta prisms provided in the rotation-irradiating section and arranged in the direction of the rotary axis correspondingly to the number of said fan-shaped beams such that light-emitting directions of the respective penta prisms differ from each other or one another;
   a beam splitter configured to divide the laser beam which a corresponding one of the penta prisms requires; and
   a fixing member configured to press the penta prisms and the beam splitter against the rotation-irradiating section, such that the penta prisms and the beam splitter are fixed to the rotation-irradiating section under pressure.

2. The rotary laser apparatus set forth in claim 1, further comprising cylindrical lenses provided at emitting planes of the respective penta prisms and each configured to convert the laser beam to the fan-shaped beam,
   wherein inclinations of the fan beams are set by arrangement of the respective cylindrical lens.

3. The rotary laser apparatus set forth in claim 1, further comprising a polarizing plate provided between the laser beam source and the rotation-irradiating section, said
   wherein the polarizing plate is configured to enter the laser beam from the laser beam source into the penta prism in the form of a circularly polarized light beam.

4. The rotary laser apparatus set forth in claim 1, wherein said beam splitter is arranged between the adjacent penta prisms, and configured to divide the laser beam from the laser beam source such that light amounts of the fan-shaped beams formed by the respective penta prisms are set at specified values.

5. The rotary laser apparatus set forth in claim 1, wherein the rotation-irradiating section comprises a rotary cylinder, the penta prisms are arranged, inside the rotary cylinder, corresponding to the number of the fan-shaped beams, the rotary cylinder is supported by bearings at opposite ends thereof as viewed in the rotary axis, and the fan-shaped beams are irradiated under rotation in directions orthogonal to the rotary axis by rotation of the rotary cylinder.

6. The rotary laser apparatus set forth in claim 1, wherein said rotation-irradiating section comprises a rotary cylinder, and the rotation-irradiating section and the laser beam source are integrally inclinable in at least one direction with respect to a perpendicular line.

7. The rotary laser apparatus set forth in claim 1, further comprising a polarized light-removing plate provided in said projecting section.

8. A rotary laser apparatus comprising a light-projecting section and a rotation-irradiating section,
said light-projecting section comprising a laser beam projector for emitting a projecting laser beam, a collimator lens for converting the laser beam emitted from the laser beam projector to a parallel beam, and a fixed cylinder rotatably supporting a rotary cylinder to be rotated around an optical axis of the collimator lens, said rotation-irradiating section comprising first, second and third optical members and said rotary cylinder, said first, second and third optical members being configured to form first, second and third fan-shaped laser beams, respectively, each having a fan-shaped plane expanding as the laser beam goes apart from said axis, said first optical member comprising a first penta prism and a first lens, said first penta prism comprising an incident plane which is orthogonal to the optical axis of the collimator lens and into which parallel light beam is led, a permeable plane which reflects a part of the parallel light beam entering the incident plane and permeates the remainder therethrough, an emitting plane, and a reflecting plane which deflects the parallel light beam reflected from the permeable plane in a direction orthogonal to the optical axis of the collimator lens and reflects the beam toward the emitting plane, said first lens converting the parallel light beam emitted from the emitting plane to the first fan-shaped laser beam, said second optical member comprising a second penta prism and a second lens, said second penta prism comprising an incident plane which is orthogonal to the optical axis of the collimator lens and into which the parallel light beam having permeated the permeable plane of the first penta prism are led, a permeable plane which reflects a part of the parallel light beams entering the incident plane and permeates the remainder therethrough, an emitting plane, and a reflecting plane which deflects the parallel light beam reflected from the permeable plane in a direction orthogonal to the optical axis of the collimator lens and reflects the beam toward the emitting plane, the second lens converting the parallel light beam emitted from the emitting plane to the second fan-shaped laser beam, the third optical member comprising a third penta prism and a third lens, said third penta prism comprising an incident plane which is orthogonal to the optical axis of the collimator lens and into which a parallel light beam having permeated the permeable plane of the second penta prism is led, a first reflecting plane which reflects the parallel light beams entering the incident plane, an emitting plane, and a second reflecting plane which deflects the parallel light beam reflected from the first reflecting plane in a direction orthogonal to the optical axis of the collimator lens and reflects the beam toward the emitting plane, the third lens being configured for converting the parallel light beam emitted from the emitting plane to the third fan-shaped laser beam, a first beam splitter being provided between the permeable plane of the first penta prism and the incident plane of the second penta prism, the first beam splitter burying a gap between the permeable plane of the first penta prism and the incident plane of the second penta prism, and determining a transmittance/reflectance, a second beam splitter being provided between the permeable plane of the second penta prism and the incident plane of the third penta prism, the second beam splitter burying a gap between the permeable plane of the second penta prism and the incident plane of the third penta prism, and determining a transmittance/reflectance, an auxiliary member for supplementing pressing being provided at the first reflecting plane of the third penta prism, said auxiliary member having a pressing surface parallel to the first reflecting plane and the incident planes of the respective first optical member to the third optical member, the first penta prism and the third penta prism being axially fixed in the rotary cylinder under pressure, holding the second penta prism there between, while the emitting planes of the first and third penta prisms being deviated from each other in a rotating direction of the rotary cylinder, such that the first and third fan-shaped planes of the first and third fan-shaped laser beams, respectively form the specific angle and that the first and third fan-shaped planes of the first and third fan-shaped laser beams, respectively become symmetrical with each other via the fan-shaped plane of the second fan-shaped laser beam.

9. The rotary laser apparatus set forth in claim 8, further comprising a polarized light-removing plate provided in said light-projecting section.

10. The rotary laser apparatus according to claim 1, further comprising a ¼ wavelength plate provided in the projecting *section*.

11. The rotary laser apparatus according to claim 1, wherein the penta prisms and the beam splitter are bonded mutually by an adhesive.

12. The rotary laser apparatus according to claim 2, wherein the fixing member is bonded to a corresponding one of the penta prisms by an adhesive.

13. The rotary laser apparatus according to claim 1, wherein the fixing member includes:

a fixing auxiliary member attached to corresponding one of the penta prisms;

a fixing plate attached with the fixing auxiliary member; and a fastener fixing the fixing plate to one end of the rotation-irradiating section, whereby the fixing member exerts the pressure from said one end to the other end of the rotation-irradiating section to fix the penta prisms and the beam splitter therebetween under the pressure.

14. The rotary laser apparatus according to claim 8, further comprising a ¼ wavelength plate provided in the projecting *section*.

15. The rotary laser apparatus according to claim 8, wherein the penta prisms and the beam splitters are bonded mutually by an adhesive.

16. The rotary laser apparatus according to claim 6, wherein the fixing member is bonded to a corresponding one of the penta prisms by an adhesive.

17. The rotary laser apparatus according to claim 8, wherein the first fan-shaped laser beam has the fan-shaped plane orthogonal to a rotary plane of the rotary cylinder, the second fan-shaped laser beam has the fan-shaped plane oblique to the fan-shaped plane of the first fan-shaped laser beam, and the third fan-shaped laser beam has the fan-shaped plane orthogonal to the rotary plane of the rotary cylinder.

* * * * *